(12) United States Patent
Hosotani

(10) Patent No.: US 6,201,713 B1
(45) Date of Patent: Mar. 13, 2001

(54) SWITCHING POWER SUPPLY UNIT HAVING SUB-SWITCHING ELEMENT AND TIME CONSTANT CIRCUIT

(75) Inventor: Tatsuya Hosotani, Muko (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/425,108

(22) Filed: Oct. 18, 1999

(30) Foreign Application Priority Data

Oct. 29, 1998 (JP) .................................... 10-308490
May 14, 1999 (JP) .................................... 11-134471
Jul. 28, 1999 (JP) .................................... 11-213823

(51) Int. Cl.$^7$ .................................................. H02M 3/335
(52) U.S. Cl. ............................................ 363/19; 363/131
(58) Field of Search ................................ 363/15, 16, 18, 363/190, 131

(56) References Cited

U.S. PATENT DOCUMENTS

| | | | |
|---|---|---|---|
| 3,889,173 | * 6/1975 | Klusmann et al. | |
| 4,084,219 | * 4/1978 | Furukawa et al. | |
| 4,443,838 | * 4/1984 | Yamada | 363/19 |
| 4,630,186 | 12/1986 | Kudo | 363/19 |
| 4,758,937 | * 7/1988 | Usui et al. | 363/19 |
| 4,862,338 | * 8/1989 | Tanaka | 363/19 |
| 4,942,508 | * 7/1990 | Nakamura | 363/19 |
| 4,958,268 | * 9/1990 | Nagagata et al. | 363/16 |
| 5,012,399 | * 4/1991 | Takemura et al. | 363/18 |
| 5,430,640 | 7/1995 | Lee | 363/127 |
| 5,663,877 | 9/1997 | Dittli et al. | 363/127 |
| 5,751,560 | 5/1998 | Yokoyama | 363/18 |
| 5,781,420 | * 7/1998 | Xia et al. | 363/16 |
| 5,838,556 | * 11/1998 | Yokoyama | 363/19 |
| 6,038,143 | * 3/2000 | Miyazaki et al. | 363/19 |

FOREIGN PATENT DOCUMENTS

| | | | |
|---|---|---|---|
| 0843403 | 5/1998 | (EP) | H02M/3/338 |
| 837777 | 2/1996 | (JP) | H02M/3/28 |
| 8317647 | 11/1996 | (JP) | H02M/3/28 |

\* cited by examiner

Primary Examiner—Jeffrey Sterrett
(74) Attorney, Agent, or Firm—Ostrolenk, Faber, Gerb & Soffen, LLP

(57) ABSTRACT

A switching power supply unit providing a DC output has a DC power supply; a transformer having a primary winding and a secondary winding; a main-switching element for connecting in series to the primary winding; one or more sub-switching elements for performing ON/OFF operations in synchronism with or opposite to the ON/OFF operations of the main-switching element; a sub-switching-element drive winding disposed in the transformer for generating voltage turning the sub-switching element on; a turn-off switching element for turning the sub-switching element off; and a time-constant circuit for controlling the turn-off switching element.

31 Claims, 13 Drawing Sheets

SWITCHING POWER SUPPLY UNIT HAVING SUB-SWITCHING ELEMENT AND TIME CONSTANT CIRCUIT

BACKGROUND OF THE INVENTION

1. Field of the Invention

The present invention relates to a switching power supply unit having a main-switching element and one or more sub-switching elements, which perform ON/OFF operations in synchronism with the ON/OFF operations of the main-switching element or opposite to.

2. Description of the Related Art

In general, in electronic equipment such as electronic calculators and communication devices, a switching power supply unit has been widely used for supplying a stabilized DC voltage from a commercial AC power supply. Such a switching power supply unit may comprise in each circuit system such a forward converter or a flyback converter, in which a main-switching element, which is connected in series to a primary winding of a transformer, is repeatedly turned on/off, and then an input voltage is intermittently applied to the transformer so as to obtain a DC output through a rectifying/smoothing circuit connected to a secondary winding. In contrast with such switching power supply units, there are provided switching power supply units, in which improvement in circuit characteristics can be achieved by adding a circuit which includes a sub-switching element performing ON/OFF operations in synchronism with or opposite to the ON/OFF operations of a main-switching element.

A description will be given of a structure of a conventional switching power supply unit having such a sub-switching element, referring to the drawings.

First, a conventional unit disclosed in Japanese Unexamined Patent Publication No. 8-317647 will be illustrated, referring to FIG. 26.

In this figure, numeral 50 represents a switching power supply unit, which has a partial-resonance converter circuit 51 and a drive circuit 52. Of these components, the partial-resonance converter circuit 51 comprises capacitors C51, C52, C53 and C54, diodes D51, D52 and D53, a transformer T51, a main-switching element S51 and a sub-switching element S52.

In addition, the drive circuit 52 comprises an output control circuit 53, comparators 54 and 55, an inverter 56, an isolating circuit 57, a triangle-wave oscillator 58, a light-emitting-side photocoupler Pa, a light-receiving-side photocoupler Pb, a transistor Q51, and resistors R51, R52, and R53.

In the switching power supply unit having the above-described structure, the sub-switching element S52 performs ON/OFF operations in reverse to the ON/OFF operations of the main-switching element S51.

Next, another conventional circuit disclosed in Japanese Unexamined Patent Application No. 8-37777 will be illustrated with reference to FIG. 27.

In this figure, numeral 60 represents a switching power supply unit, in which an FET disposed on the secondary side of a transformer is used for rectification. This is referred to as the so-called synchronous rectification system. The switching power supply unit 60 comprises a transformer T61, an input capacitor C61, an FET Q61 as a main-switching element, an FET Q62 as a sub-switching element, similarly, an FET Q63 as another sub-switching element, a choke coil L61, an output capacitor C62, a light-emitting-side photocoupler PA, a light-receiving-side photocoupler PB, comparators 61, 62 and 63, a triangle-wave oscillator 64, isolating circuits 65 and 66, an inverter 67, a control circuit 68, and a control-signal output circuit 69. Of these constituent parts, the control-signal output circuit 69 comprises transistors Q64 and Q65, and resistors R61 to R65.

In the switching power supply unit 60 having the above-described structure, the FET Q62 performs ON/OFF operations in synchronism with the ON/OFF operations of the FET Q61, whereas the FET Q63 performs ON/OFF operations in reverse to the ON/OFF operations of the FET Q61.

In each of the above-described switching power supply units, however, the circuit driving the sub-switching element is formed of an IC. Additionally, since a ground level is different between the main-switching element and the sub-switching element, the installation of an IC and an isolating circuit comprising a photocoupler is necessary. As a result, the use of an IC, a pulse transformer, or the like, leads to complications in the circuit structure and increase in production cost. Furthermore, such an increase in the number of parts can be a hindrance to miniaturization and weight reduction.

SUMMARY OF THE INVENTION

Accordingly, it is an object of the present invention to provide a switching power supply unit capable of achieving reduction in cost, size and weight by simply forming a circuit for controlling a sub-switching element performing ON/OFF operations in synchronism with or oppositely to the ON/OFF operations of a main-switching element without using an IC and an isolating circuit.

To this end, the present invention provides a switching power supply unit capable of providing a DC output, which includes a DC power supply, a transformer having a primary winding and a secondary winding, a main-switching element for connecting in series to the primary winding, one or more sub-switching elements for performing ON/OFF operations in synchronism with or oppositely to the ON/OFF operations of the main-switching element a sub-switching-element drive winding for generating voltage turning the sub-switching element on, a switching unit for turning the sub-switching element off, and a time-constant circuit for controlling the switching unit.

Additionally, according to the present invention, the switching unit includes a transistor, whose emitter or collector is connected to the control terminal of the sub-switching element, whereas the base of the transistor is connected to the time-constant circuit.

Additionally, according to the present invention, the time-constant circuit includes a first impedance circuit and a first capacitor charged/discharged by voltage generated in the sub-switching-element drive winding.

Additionally, according to the present invention, the impedance value of the first impedance circuit changes in accordance with the DC output or in response to a signal.

Additionally, according to the present invention, the control terminal of the sub-switching element is connected to an end of the sub-switching-element drive winding through a second impedance circuit.

Additionally, according to the present invention, the second impedance circuit includes a second capacitor.

Furthermore, the above second impedance circuit includes an inductor.

Furthermore, the impedance value of the first or second impedance circuit varies with a direction of current flowing through the impedance circuit.

In addition, the switching power supply unit of the present invention further includes a voltage-stabilizing circuit for stabilizing voltage applied to the time-constant circuit.

In addition, the above-described voltage-stabilizing circuit has a Zener diode.

According to the switching power supply unit of the present invention, adjustment of a time constant of the time-constant circuit permits the ON time of the sub-switching element to be set arbitrarily. Moreover, the second impedance circuit permits the timing for turning on the sub-switching element to be adjusted. In this arrangement, both the main-switching element and the sub-switching element can be turned on/off by inserting a deadtime in which both of the switching elements are turned off between their on/off operations. There are thus no losses and no breakdowns of the elements caused when both of them are simultaneously turned on.

Furthermore, since the sub-switching element is driven by the voltage generated in the sub-switching-element drive winding of the transformer, the installation of an IC and an isolating circuit comprising photoelectric devices such as a pulse transformer and a photocoupler is not necessary. As a result, the number of components, size, weight, and production cost can be reduced.

Furthermore, when the transistor as the switching unit is turned on, the sub-switching element is rapidly turned off. This accelerates the switching speed so as to reduce the switching losses of the sub-switching element.

The resistor forming the second impedance circuit connected between the gate of the FET as the sub-switching element and an end of the sub-switching-element drive winding can reduce surge voltage generated between the gate and the source of the FET.

Additionally, the bead or the inductor forming the second impedance circuit connected between the gate of the FET as the sub-switching element and an end of the sub-switching-element drive winding can reduce surge voltage generated between the gate and the source of the FET.

Furthermore, the second impedance circuit can control the application of voltage from the sub-switching-element drive winding to the sub-switching element so as to delay the operations for turning on the sub-switching element. Accordingly, the adjustment of the impedance value of the second impedance circuit permits the sub-switching element to be turned on with an appropriate timing.

Furthermore, the second capacitor forming the second impedance circuit permits the DC current to be cut off so as to reduce the drive losses of the sub-switching element.

In addition, since the impedance value of the first impedance circuit varies or switches according to the output of the switching power supply unit, the timing for turning the FET Q2 on can be adjusted to a value in proportion to the output of the switching power supply unit by changing the time for charging/discharging the capacitor comprising the time-constant circuit.

In addition, since the impedance value of the first or second impedance circuit varies with a direction of current flowing through the circuit, an appropriate impedance value can be set according to a positive voltage and a negative voltage generated in the sub-switching-element drive winding or according to an ON/OFF ratio of the sub-switching element. Moreover, it is possible to set an impedance value, in which the fluctuations of an ON time of the sub-switching element are the smallest with respect to the fluctuations of the ON/OFF ratio of the main-switching element.

Furthermore, the installation of the voltage-stabilizing circuit for stabilizing voltage applied to the time-constant circuit in the sub-control circuit permits the ON time of the sub-switching element to be maintained substantially constant regardless of the fluctuations of input voltage, so that a zero-voltage switching operation by the main-switching element can be achieved.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWING(S)

DETAILED DESCRIPTION OF EMBODIMENTS OF THE INVENTION

Hereinafter, the preferred embodiments of the present invention are explained in detail with reference to the drawings.

Figure 1:
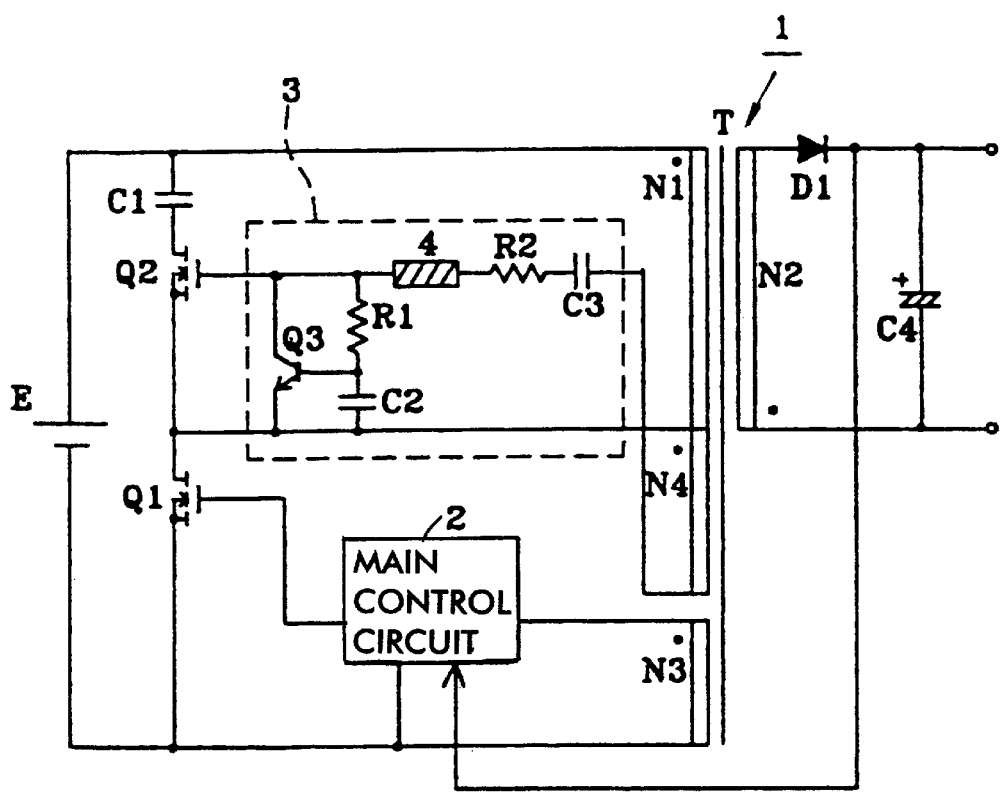
FIG. 1 is a circuit diagram of a switching power supply unit according to a first embodiment of the present invention.

In FIG. 1, numeral 1 represents a switching power supply unit, which is an application circuit of the one ordinarily referred to as a fly-back converter. In this system, a main-switching element is alternately turned ON/OFF, in which energy is stored during an ON time and then, power is supplied to a load during an OFF time. In addition, the switching power supply unit 1 adopts an active clamping system, in which it clamps a surge voltage given to the main-switching element, so that the zero-voltage switching operation by the main-switching element and the sub-switching element can be achieved.

The switching power supply unit 1 has a DC power supply E and a transformer T. In this case, the DC power supply E may be obtained by rectifying and smoothing an AC input. The transformer T has a primary winding N1, a secondary winding N2, a main-switching-element drive winding (hereinafter referred to as a first drive winding) N3, and a sub-switching-element drive winding (hereinafter referred to as a second drive winding) N4.

In addition, an FET Q1 as the main-switching element, the primary winding N1 of the transformer T and the DC power supply E are connected in series, and a series circuit including an FET Q2 as the sub-switching element and a capacitor C1 is connected between both ends of the primary winding N1 of the transformer T.

The gate of the FET Q1 is connected to an end of the first drive winding N3 through the main-switching-element control circuit (hereinafter referred to as a main control circuit) 2. The source of the FET Q2 is connected to the drain of the FET Q1, whereas the gate of the FET Q2 is connected to an end of the second drive winding N4 of the transformer T through the sub-switching-element control circuit (hereinafter referred to as a sub-control circuit) 3.

Furthermore, the gate and the source of the FET Q2 are connected between both ends of the second drive winding N4 through the sub-control circuit 3. In this case, the sub-control circuit 3 includes an non-type transistor Q3 as a switching unit, a capacitor C2 as a first capacitor, a resistor R1 as a first impedance circuit, a capacitor C3 as a second capacitor, a resistor R2, and a bead 4, which is a kind of inductor. Such a bead may be a ferrite bead or an amorphous bead. Of these components, the capacitor C2 and the resistor R1 form a time-constant circuit. In addition, the capacitor C3, the resistor R2 and the bead 4 form a second impedance circuit. An FET may be used as a switching unit.

Furthermore, the switching power supply unit 1 has a diode D1 as a rectifying circuit and a capacitor C4 as a smoothing circuit on the secondary side of the transformer T.

Next, a description will be given of the operations of the switching power supply unit 1 having the above structure.

First, when the unit starts operating, voltage is applied to the gate of the FET Q1 through a resistor for starting operations (not shown) disposed in the main control circuit 2 to turn on the FET Q1. When the FET Q1 is turned on, voltages having a mutually equivalent polarity are generated both in the primary winding N1 of the transformer T and the first drive winding N3 of the same. In this situation, the FET Q1 is in an ON state, so that excitation energy is stored in the primary winding N1.

In addition, when the FET Q1 is turned off by the main control circuit 2, the excitation energy stored in the primary winding N1 of the transformer T is discharged as electric energy through the secondary winding N2, and then, is rectified and smoothed by the diode D1 and the capacitor C4 so as to be supplied to a load.

Then, when the excitation energy stored in the primary winding N1 of the transformer T is all discharged through the secondary winding N2, a voltage having the same polarity as that of the voltage generated on startup is generated so as to turn on the FET Q1. As a result, with the ON/OFF operations of the FET Q1, the electric energy is supplied to the load.

Next, the operations of the FET Q2 will be illustrated below. The FET Q2 performs ON/OFF operations in reverse to the ON/OFF operations of the FET Q1 in order to reduce the switching losses and switching surges of the FET Q1.

First, when the FET Q1 is turned off, a voltage of the reverse polarity to that of the voltage generated on startup of the FET Q1 is generated. This voltage is applied to the gate of the FET Q2 through the capacitor C3, the resistor R2 and the bead 4 forming the sub-control circuit 3 so as to turn on the FET Q2. The voltage generated in the second drive winding N4 is applied to the capacitor C2 through the resistor R1 constituting the time-constant circuit so as to charge the capacitor C2. Then, when the voltage charged in the capacitor C2 reaches the threshold voltage of the transistor Q3, the transistor Q3 is turned on. This results in cancellation of the voltage difference between the gate and the source of the FET Q2, so that application of voltage to the gate of the FET Q2 is suspended and the FET Q2 is thereby quickly turned off.

In this case, a time constant of the time-constant circuit comprising the resistor R1 and the capacitor C2 is equivalent to the time which it takes the voltage charged in the capacitor C2 to reach the threshold voltage of the transistor Q3 after voltage has been generated in the second drive winding N4.

Figure 2:
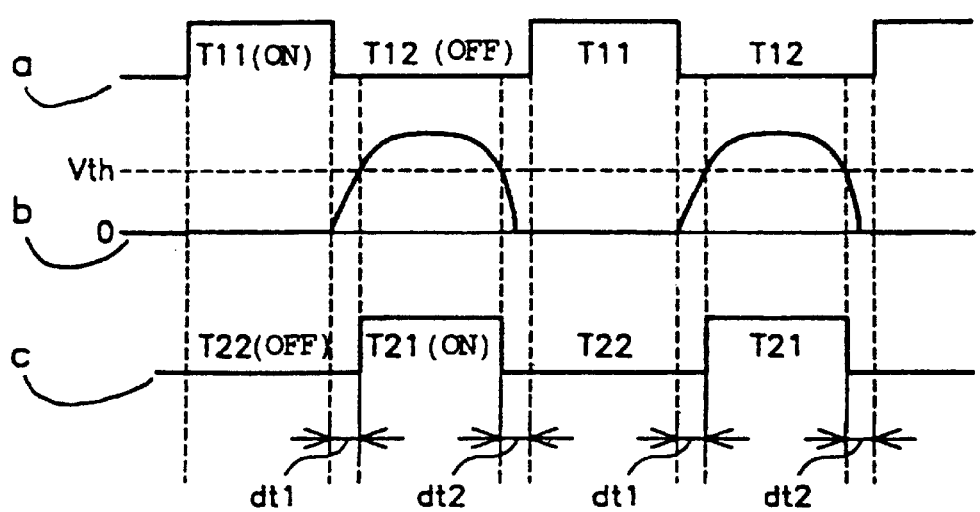
FIG. 2 is a waveform chart of the operations of the switching power supply unit shown in FIG. 1.

FIG. 2 shows a timing of the ON/OFF operations of the FET Q1 and the FET Q2 described above.

In FIG. 2, a waveform a shows the drive pulse of the FET Q1, a waveform b shows the gate voltage of the FET Q2, and a waveform c shows the drive pulse of the FET Q2.

In this figure, at the end of an ON time T11 of the FET Q1 is placed a deadtime dt1, in which both the FET Q1 and the FET Q2 are turned off, after which the ON time T21 of the FET Q2 starts. The deadtime dt1 is produced as a consequence of a delay occurring in the operation for turning on the FET Q2 resulting from suppression of the voltage application from the second drive winding N4 of the transformer T to the gate of the FET Q2 by the resistor R2 and the bead 4.

The time for a delay occurring when the FET Q2 is turned on is equivalent to the time which it takes the gate voltage of the FET Q2 to reach the threshold voltage Vth up from 0

V. Therefore, the time is equivalent to the time in which the input capacitance of the FET Q2 (the capacitance between the gate and the source) is charged until the gate voltage reaches the threshold voltage Vth. In addition, the inclination of a waveform obtained by the time which it takes the gate voltage of the FET Q2 to reach the threshold voltage Vth is obtained by an impedance value of the second impedance circuit which is determined by the resistance value of the resistor R2, the inductance value of the bead 4 and the capacitance value of the capacitor C2; a value of voltage generated in the second drive winding N4; and the input capacity of the FET Q2. Thus, the inclination of the waveform can be adjusted to determine the length of the deadtime dt1 by using the impedance value of the second impedance circuit and the value of voltage generated in the second drive winding N4. Furthermore, when the FET Q2 has a small input capacitance, an external capacitor may be connected between the gate and the source of the FET Q2 to form the second impedance circuit.

Additionally, regarding the resistor R1 and the capacitor C2 forming the time-constant circuit, a time constant differs according to how much resistance value or capacity value they have. Thus, adjustment of the time constant can depend on the selection of components used as the resistor R1 and the capacitor C2. This arrangement permits the turning-off operation of the FET Q2 to be accelerated or delayed, so that the length of the ON time T21 of the FET Q2 can be adjusted.

Additionally, at the end of the ON time T21 of the FET Q2 is placed a deadtime dt2, in which both the FET Q1 and the FET Q2 are turned off, after which the FET Q1 is turned on.

As described above, in the switching power supply unit 1, since the FET Q1 and the FET Q2 perform mutually reversed ON/OFF operations, with the deadtimes dt1 and dt2 being placed between the operations, there are no losses and breakdown of the elements occurring when the two FETs are simultaneously turned on.

Moreover, since the FET Q2 as the sub-switching element is driven by voltage generated in the second drive winding N4 of the transformer T, no use of an IC and photoelectronic elements such as a pulse transformer and a photocoupler is necessary, so that decrease in the number of components, miniaturization, reduction of weight and production cost can be achieved.

In addition, when the transistor Q3 is turned on, the FET Q2 is rapidly turned off, whereby the switching speed is accelerated, with the result that the switching losses of the FET Q2 can be reduced.

Furthermore, the resistor R2 permits the surge voltage generated between the gate and the source of the FET Q2 to be reduced.

Furthermore, the bead 4 permits the surge current generated between the gate and the source of the FET Q2 to be reduced.

In addition, the resistor R2 and the bead 4 suppress the application of voltage from the second drive winding N4 to the gate of the FET Q2 so as to delay the operation for turning on the FET Q2. Accordingly, the adjustment of the resistance value of the resistor R2 or the inductance value of the bead 4 allows the FET Q2 to be turned on with an appropriate timing.

The capacitor C3 as the second capacitor cuts off the DC current so that the drive losses of the FET Q2 can be reduced.

Although the bead 4 is used as an inductor in the above embodiment, it is possible to use a different inductor such as a winding coil, and it is also possible to use a plurality of inductors connected in series.

Furthermore, the structure of the sub-control circuit for controlling the ON/OFF operations of the FET Q2 should not be limited to the above-described one. For example, the structures indicated by 3a to 3g shown in FIGS. 3 to 9 perform the same operations as that of the above circuit so as to obtain the same advantages. Each of FIGS. 3 to 9 shows only the main part of the switching power supply unit. The same reference numerals are given to the same parts as those in FIG. 1 or the equivalent parts to those in FIG. 1 and the explanation thereof is omitted.

Figure 3:
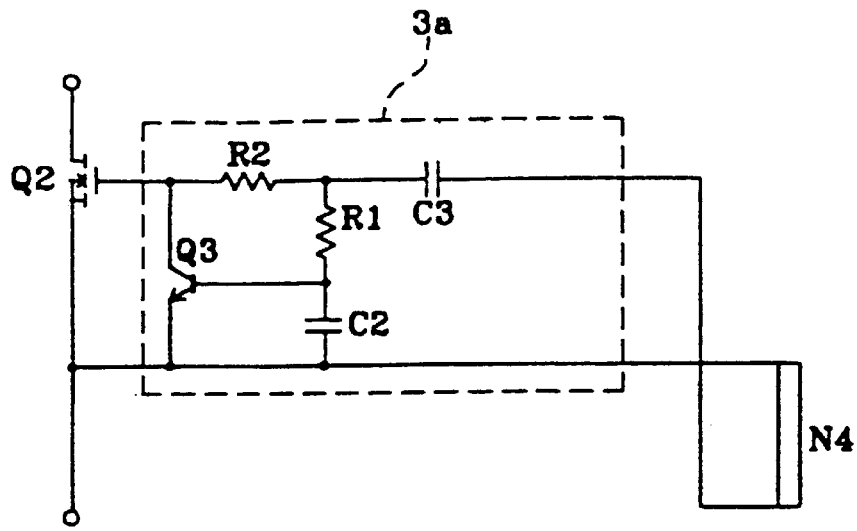
FIG. 3 is a circuit diagram of a modification of the switching power supply unit shown in FIG. 1.

Among these parts, the sub-control circuit 3a shown in FIG. 3 is different from the sub-control circuit 3 shown in FIG. 1, in the ways that the circuit 3a omits the bead 4 and changes the point for connecting the resistor R1.

Figure 4:
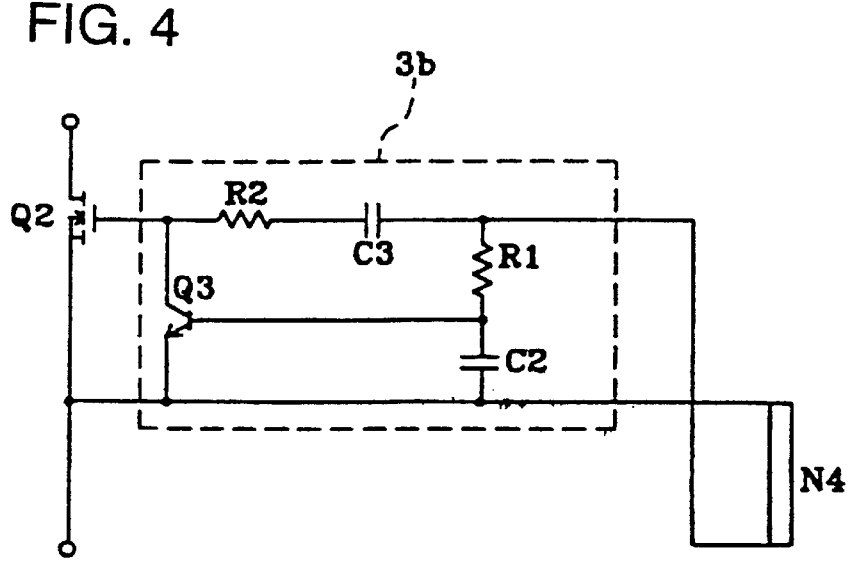
FIG. 4 is a circuit diagram of another modification of the switching power supply unit shown in FIG. 1.

Additionally, the sub-control circuit 3b shown in FIG. 4 is different from the sub-control circuit 3 shown in FIG. 1, in the ways that the circuit 3b omits the bead 4 and changes the point for connecting the resistor R1.

Figure 5:
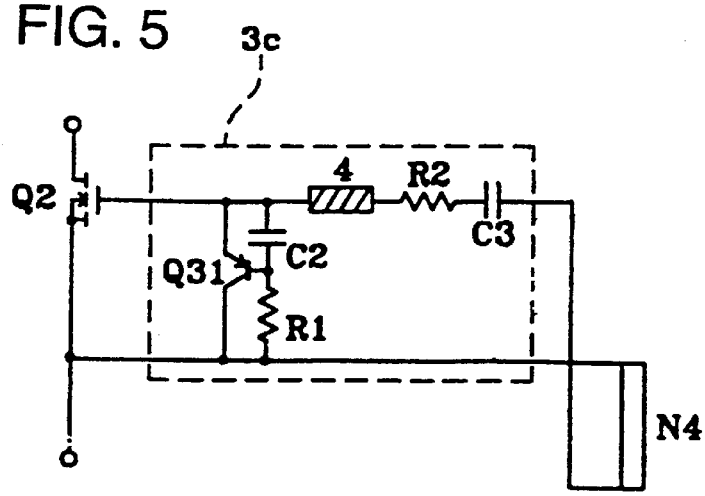
FIG. 5 is a circuit diagram of another modification of the switching power supply unit shown in FIG. 1.

Furthermore, the sub-control circuit 3c shown in FIG. 5 is different from the sub--control circuit 3 shown in FIG. 1, in the ways that the circuit 3c uses a pnp-type transistor Q31, and according to that, the positions of the capacitor C2 and the resistor R1 are interchanged.

Figure 6:
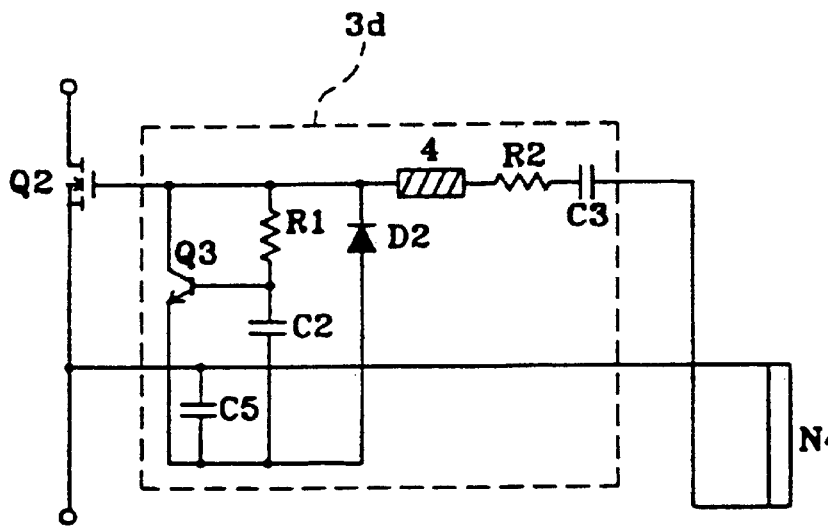
FIG. 6 is a circuit diagram of another modification of the switching power supply unit shown in FIG. 1.

Furthermore, the sub-control circuit 3d shown in FIG. 6 is different from the sub-control circuit 3 shown in FIG. 1, in the way that a capacitor C5 and a diode D2 are disposed in the circuit 3d.

Figure 7:
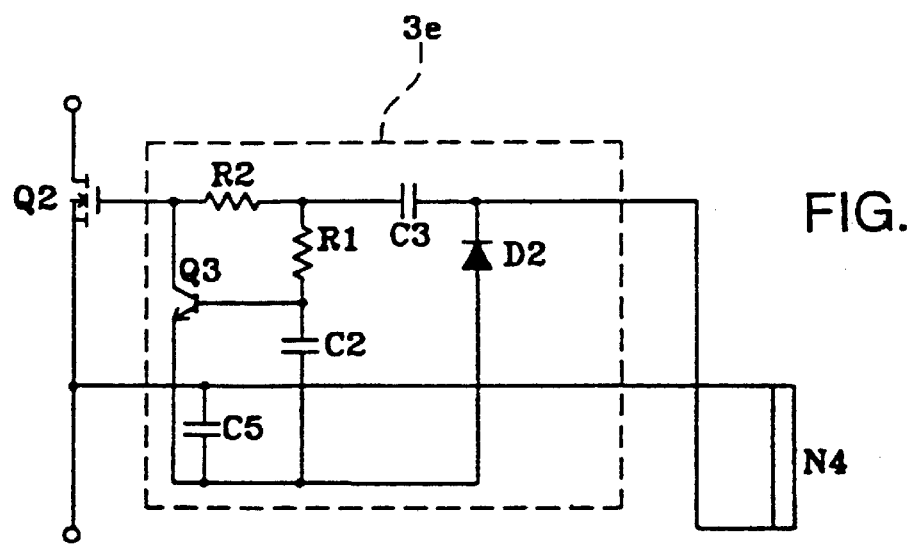
FIG. 7 is a circuit diagram of another modification of the switching power supply unit shown in FIG. 1.

Furthermore, the sub-control circuit 3e shown in FIG. 7 is different from the sub-control circuit 3d shown in FIG. 6, in the ways that the circuit 3e omits the bead 4 and changes the points for connecting the resistor R1 and the diode D2.

Figure 8:
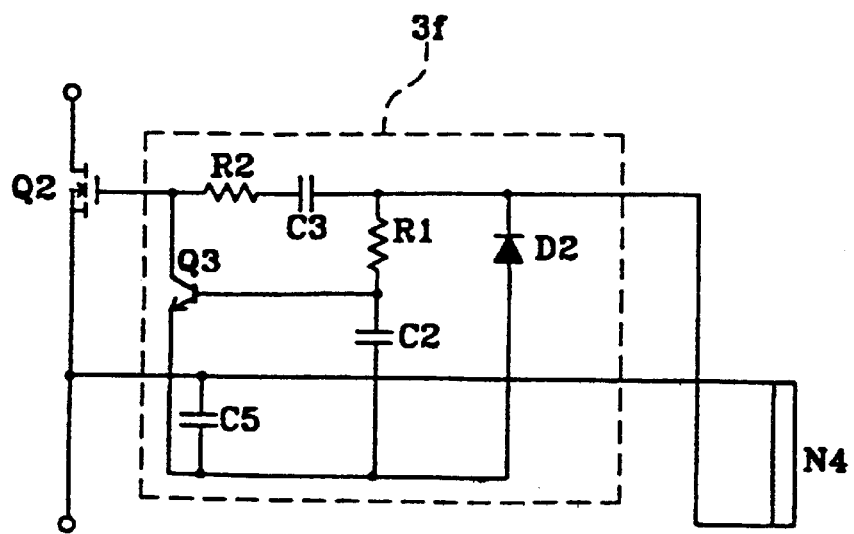
FIG. 8 is a circuit diagram of another modification of the switching power supply unit shown in FIG. 1.

Furthermore, the sub-control circuit 3f shown in FIG. 8 is different from the sub-control circuit 3d shown in FIG. 6, in the ways that the circuit 3f also omits the bead 4 and changes the points for connecting the resistor R1 and the diode D2.

Figure 9:
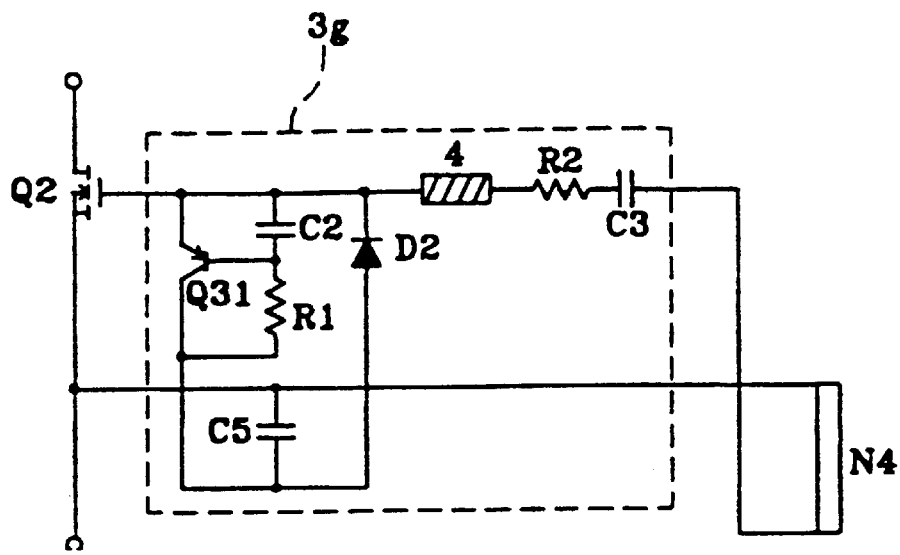
FIG. 9 is a circuit diagram of another modification of the switching power supply unit shown in FIG. 1.

The sub-control circuit 3g shown in FIG. 9 is a modification of the sub-control circuit 3d shown in FIG. 6. The sub-control circuit 3g is different from the sub-control circuit 3d in the ways that the circuit 3g uses a pnp-type transistor Q31, and according to that, the positions of the capacitor C2 and the resistor R1 are interchanged.

Another modification of the switching power supply unit 1 will be illustrated with reference to FIG. 10. This figure shows only the main part, in which the same reference numerals are given to the same parts as those in FIG. 1 and the equivalent parts to those in FIG. 1 and the explanation thereof is omitted.

Figure 10:
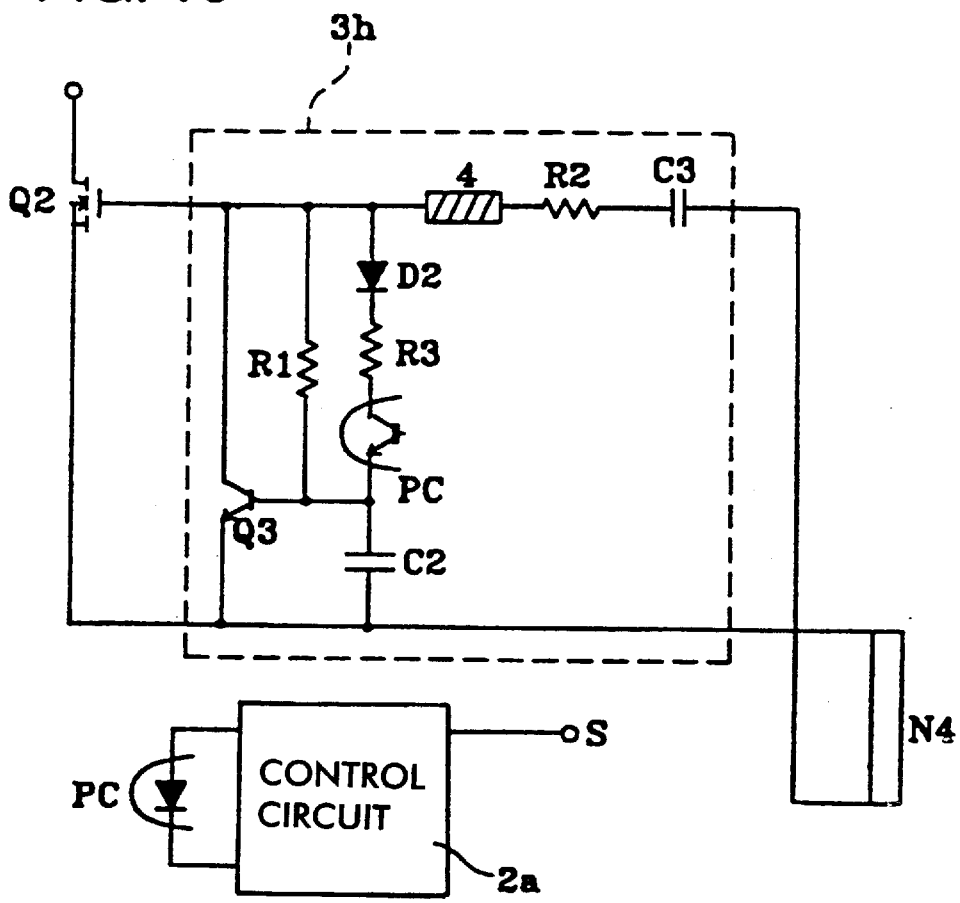
FIG. 10 is a circuit diagram of another modification of the switching power supply unit shown in FIG. 1.

In FIG. 10, a sub-control circuit 3h comprises an non-type transistor Q3, a resistor R3, and a photocoupler PC as a variable impedance element. Among these components, a part of the photocoupler PC is installed in a control circuit 2a on the secondary side of the transformer. In this case, the control circuit 2a has an input terminal S, to which the feedback of the output of the switching power supply unit 1 is given, and then, according to the output, the impedance value of the photocoupler PC is changed. As a result, this changes the impedance value of the resistor R1 as the first impedance circuit.

In this case, the impedance value of the photocoupler PC may be changed by signals instead of the feedback of the output. In this situation, the impedance value is adjusted by signals which are input to the input terminal S from a control circuit (not shown) of the main body on which the switching power supply unit 1 is mounted or from a control circuit (not shown) inside the switching power supply unit 1.

The change in the impedance value described above includes both the case of changes in a certain value range and the case of switching to any of certain plural values.

As described above, in the sub-control circuit 3h, according to the output of the switching power supply unit 1 or by signals, the impedance value of the photocoupler PC is adjusted so as to change the time for charging/discharging the capacitor C2, with the result that the timing for turning off the FET Q2 can be adjusted.

Figure 11:
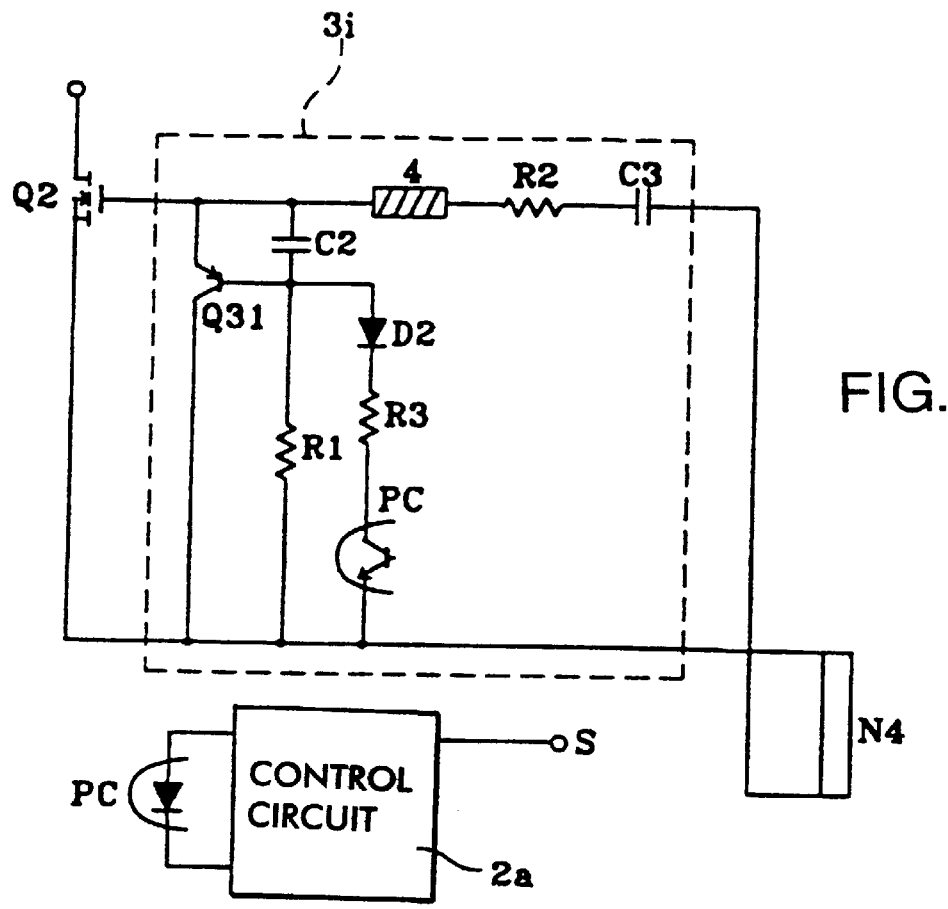
FIG. 11 is a circuit diagram of another modification of the switching power supply unit shown in FIG. 1.

A modification of the sub-control circuit 3h will be illustrated below referring to FIG. 11.

A sub-control circuit 3i shown in this figure is different from the sub-control circuit 3h in the ways that the circuit 3i uses a pnp-type transistor Q31, the position of the capacitor C2 is changed, and the resistor R3 is added. The arrangement of other parts is the same as that shown in the sub-control circuit 3h and the explanation thereof is omitted. The sub-control circuit 3i having such a structure operates the same way as the sub-control circuit 3h so as to obtain the same advantages.

The first or second impedance circuit which comprises the sub-control circuit of the switching power supply unit according to the present invention should not be limited to the one described above. For example, the impedance circuits shown in FIGS. 12 to 15 may be used. Each of FIGS. 12 to 15 shows only the main part of the unit, in which the same reference numerals are given to the same parts as those shown in FIGS. 1 to 11 or the equivalent parts to those shown in FIGS. 1 to 11 and the explanation thereof is omitted.

Figure 12:
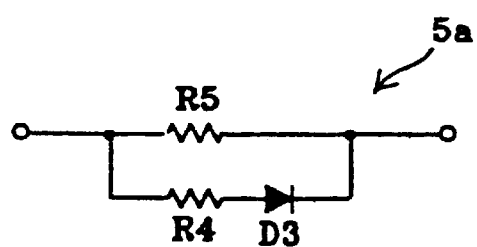
FIG. 12 is a circuit diagram of another modification of the switching power supply unit shown in FIG. 1.

An impedance circuit 5a shown in FIG. 12 comprises a resistor R4 and a diode D3 which are mutually connected in series, and also a resistor R5 connected in parallel thereto.

Figure 13:
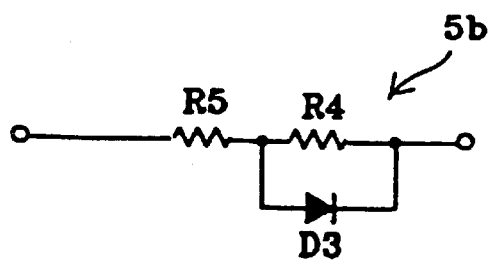
FIG. 13 is a circuit diagram of another modification of the switching power supply unit shown in FIG. 1.

An impedance circuit 5b shown in FIG. 13 comprises the resistors R4, R5, which are mutually connected in series, and the diode D3 connected in parallel to the resistor R4.

Figure 14:
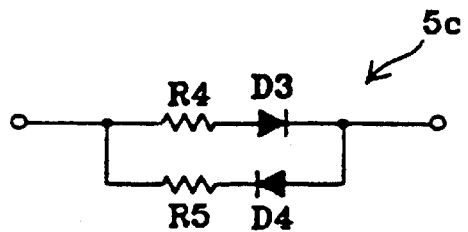
FIG. 14 is a circuit diagram of another modification of the switching power supply unit shown in FIG. 1.

An impedance circuit 5c shown in FIG. 14 comprises the resistor R4, the diode D3, which are mutually connected in series, the resistors R5 and the diode D4, which are mutually connected in series. In this case, the diodes D3 and D4 are positioned in the mutually opposite direction.

Figure 15:
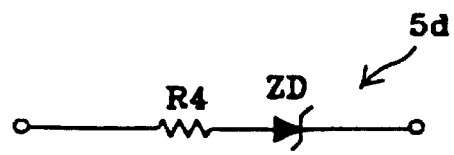
FIG. 15 is a circuit diagram of another modification of the switching power supply unit shown in FIG. 1.

An impedance circuit 5d shown in FIG. 15 comprises the resistor R4 and a Zener diode ZD, which are mutually connected in series.

In the above impedance circuits 5a to 5d, resistance is different between the case where a current direction is forward to the diode and the case where the direction is opposite to the diode, and the impedance value thereby changes.

As described above, since it is possible to change the impedance value, for example, an appropriate impedance value can be set according to a positive voltage and a negative voltage generated in the second drive winding N4 of the transformer T, or according to the ON/OFF ratio of the FET Q2. Moreover, it is also possible to set the impedance value so as to minimize the fluctuations during the ON time of the FET Q2 with respect to the fluctuations of the ON/OFF ratio of the FET Q1.

Particularly, regarding the second impedance circuit, it is possible to add either one of the capacitor C3 or the bead 4 shown in FIG. 1, or both of them, to those shown in FIGS. 12 to 15.

In the above-described switching power supply unit according to the present invention, a zero-voltage switching operation can be achieved, in which the main-switching element and the sub-switching element are turned on when the voltage applied to both ends is 0 V.

Meanwhile, since the voltage of a commercial power supply varies from country to country, when the voltage is rectified and smoothed to use as the input voltage of a switching power supply unit, the input voltage greatly varies from country to country. When the input voltage varies, in proportion to that, the voltage generated in the second drive winding, that is, the voltage applied to the time-constant circuit of the sub-control circuit varies, with the result that the ON time of the sub-switching element varies.

Furthermore, for example, when the ON time of the sub-switching element is shorter than the time for discharging energy from the secondary side of the transformer, the main-switching element cannot remove all of the electrical charge stored in the output capacity or the like and is thereby turned on before the voltages at both ends are 0 V, so that the zero-voltage switching operation cannot be achieved, leading to increase in switching-losses. In contrast, when the ON time of the sub-switching element is longer than the time for discharging energy from the secondary side of the transformer, a circulating current flowing through the main-switching element, which is not involved with energy supply, increases, and in proportion to that, a peak current increases, with the result that conductive losses or the like increases.

Figure 16:
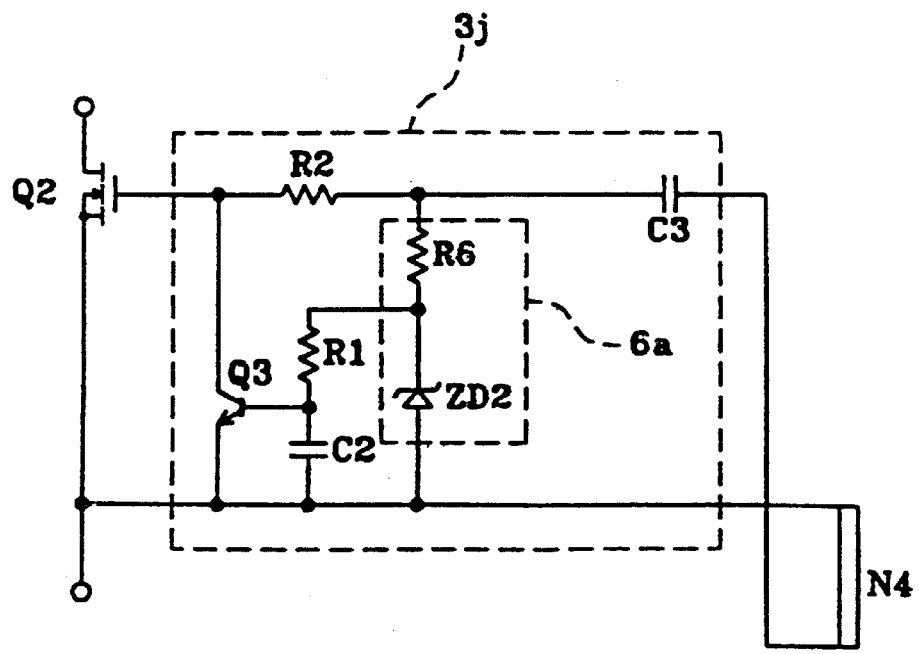
FIG. 16 is a circuit diagram of another modification of the switching power supply unit shown in FIG. 1.

Accordingly, in order to avoid such problems, another modification of the switching power supply unit 1 will be illustrated referring to FIG. 16. This figure shows only the main part of the unit, in which the same reference numerals are given to the same parts as those shown in FIG. 3 or the equivalent parts to those shown in FIG. 3, and the explanation thereof is omitted.

In FIG. 16, the sub-control circuit 3j has a voltage-stabilizing circuit 6a in which the resistor R6 and the Zener diode ZD2 are connected in series. An end of the resistor R1 is connected to a point between the resistor R6 and the Zener diode ZD2.

With this arrangement, when the FET Q2 is turned on, the potential at the point between the resistor R6 and the Zener diode ZD2 is never larger than the Zener voltage of the Zener diode ZD2 so as to maintain an almost constant value. As a result, the voltage applied to the time-constant circuit comprising the resistor R1 and the capacitor C2 remains almost constant, so that the time for charging the capacitor C2 usually remains almost constant, without depending on the voltage generated in the second drive winding N4. Therefore, even if the voltage generated in the second drive winding N4 changes by the fluctuations in the voltage of the DC power supply E, that is, by the fluctuations in the input voltage, the time before the transistor Q3 is turned on, that is, the ON time of the FET Q2 can be maintained almost invariable.

Furthermore, after the FET Q2 is turned off and then the FET Q1 is turned on, reverse voltage generated in the second drive winding N4 is applied to the time-constant circuit comprising the resistor R1 and the capacitor C2, the electric charge accumulated in the capacitor C2 is reduced and further charged in reverse. However, since the Zener diode ZD2 is present, instead of the reverse voltage generated in the second drive winding N4, only a voltage of approximately 0.6 V, which is the forward voltage of the Zener diode ZD2, is applied to the time-constant circuit. As a result, the capacitor C2 is eventually charged in reverse with the voltage of approximately 0.6 V. Thus, the initial potential used in the next charging of the capacitor C2 can be maintained constant regardless of the fluctuations of the input voltage. Moreover, stabilizing the initial state of the capacitor C2 permits the time for charging the capacitor C2 to be further stabilized.

As described above, regardless of the fluctuations of the input voltage, the ON time of the FET Q2 as the sub-switching element can be controlled to substantially remain constant, so that the zero-voltage switching operation of the main-switching element can be achieved.

Referring now to FIGS. 17 to 24, a description will be provided of a modification of the sub-control circuit 3j. Each of FIGS. 17 to 24 shows only the main part of a switching power supply unit, in which the same reference numerals are given to the same parts as those shown in FIG. 16 and the reference figures and are given to the equivalent parts thereto; the explanation thereof is omitted.

Figure 17:
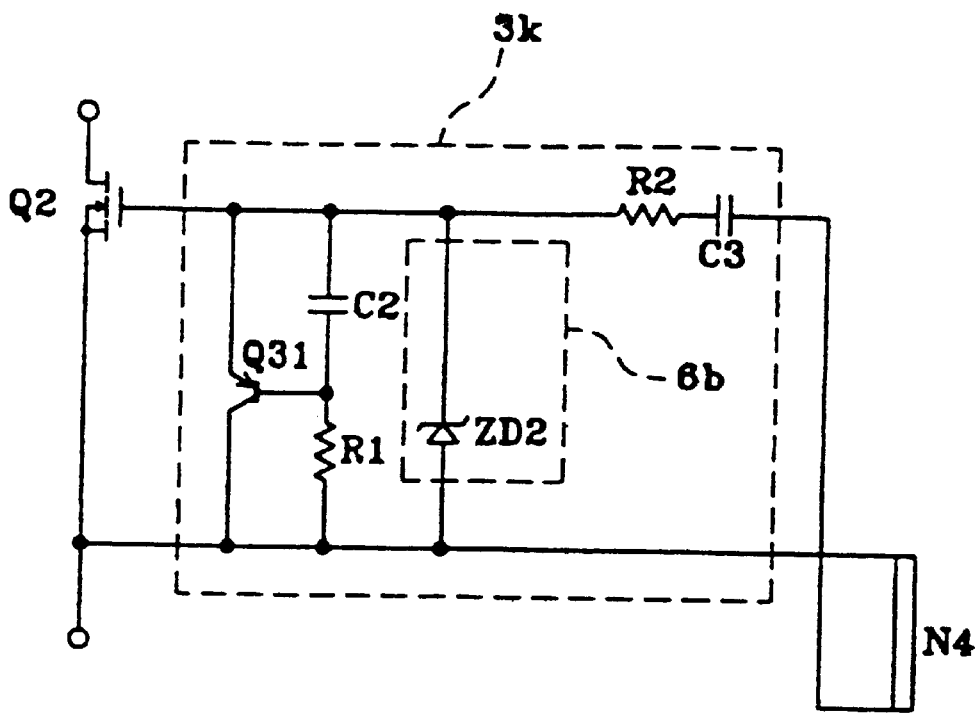
FIG. 17 is a circuit diagram of another modification of the switching power supply unit shown in FIG. 1.

A sub-control circuit 3k shown in FIG. 17 is formed in such a manner that in the sub-control circuit 3c shown in FIG. 5, the bead 4 is omitted and a voltage-stabilizing circuit 6b comprising the Zener diode ZD2 is disposed in parallel to the series circuit comprising the capacitor C2 and the resistor R1.

Figure 18:
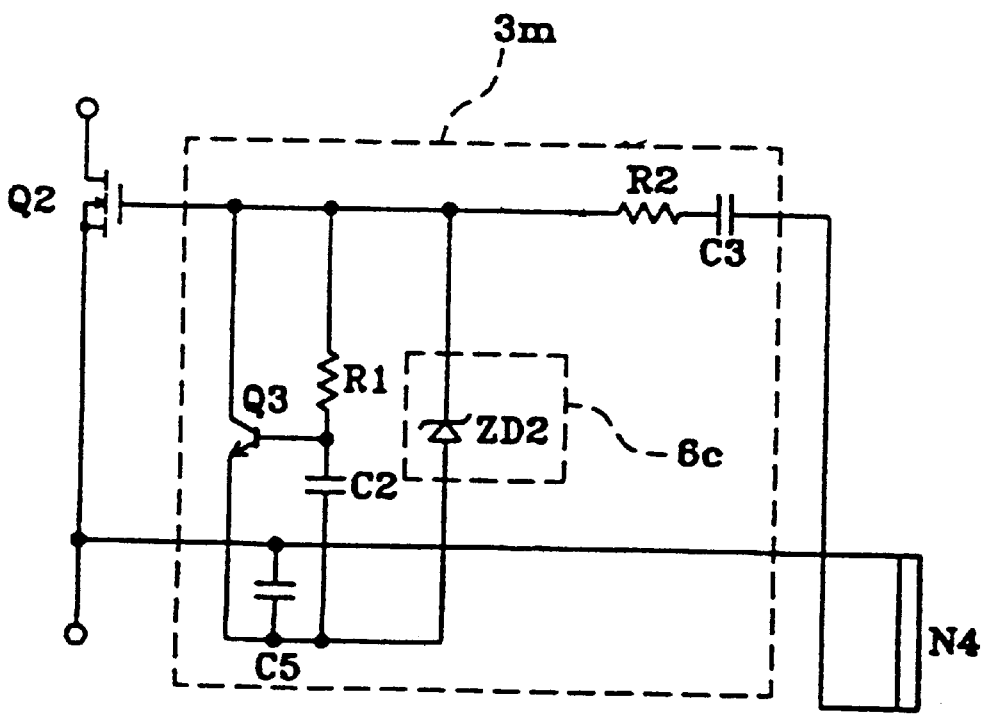
FIG. 18 is a circuit diagram of another modification of the switching power supply unit shown in FIG. 1.

A sub-control circuit 3m shown in FIG. 18 is formed in such a manner that in the sub-control circuit 3d shown in FIG. 6, the bead 4 is omitted and a voltage-stabilizing circuit 6c comprising the Zener diode ZD2 as an alternative to the diode D2 is disposed.

Figure 19:
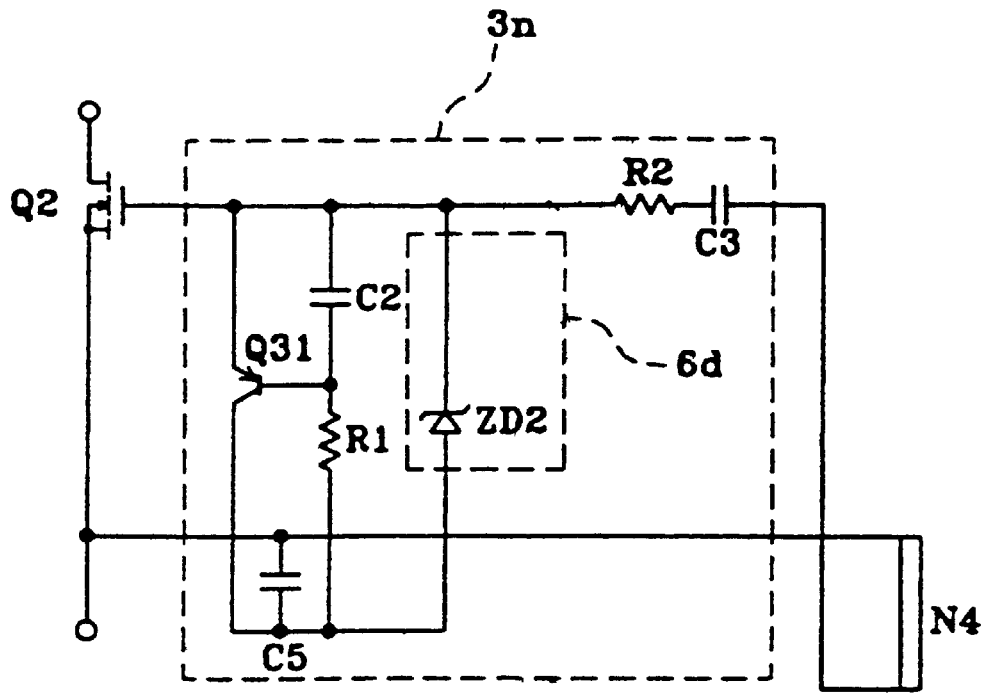
FIG. 19 is a circuit diagram of another modification of the switching power supply unit shown in FIG. 1.

A sub-control circuit 3n shown in FIG. 19 is formed in such a manner that in the sub--control circuit 3g shown in FIG. 9, the bead 4 is omitted and a voltage-stabilizing circuit 6d comprising the Zener diode ZD2 as an alternative to the diode D2 is disposed.

Figure 20:
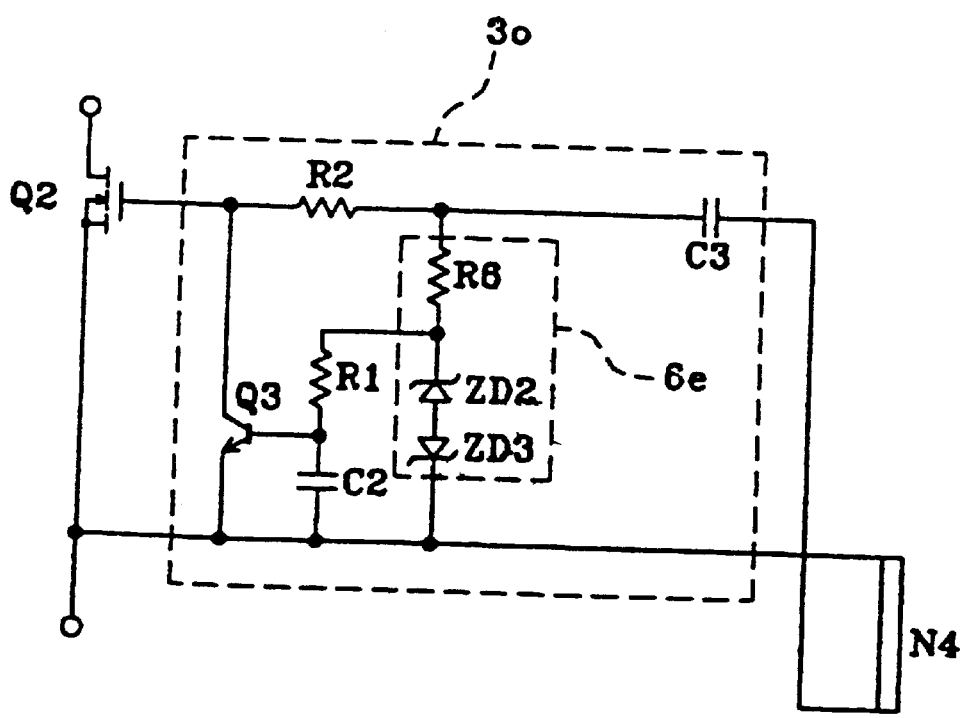
FIG. 20 is a circuit diagram of another modification of the switching power supply unit shown in FIG. 1.

A sub-control circuit 3o shown in FIG. 20 is formed in such a manner that in the sub-control circuit 3j shown in FIG. 16, a voltage-stabilizing circuit 6e comprising a Zener diode ZD3 connected in series to the Zener diode ZD2 in the opposite direction to the Zener diode ZD2 is disposed. In this case, when the capacitor C2 is charged, the Zener voltage of the Zener diode ZD2 is applied, whereas when it is discharged, the Zener voltage of the Zener diode ZD3 is applied, which makes a difference. However, since the initial state in charging the capacitor C2 is stabilized, the same advantage can be obtained.

Figure 21:
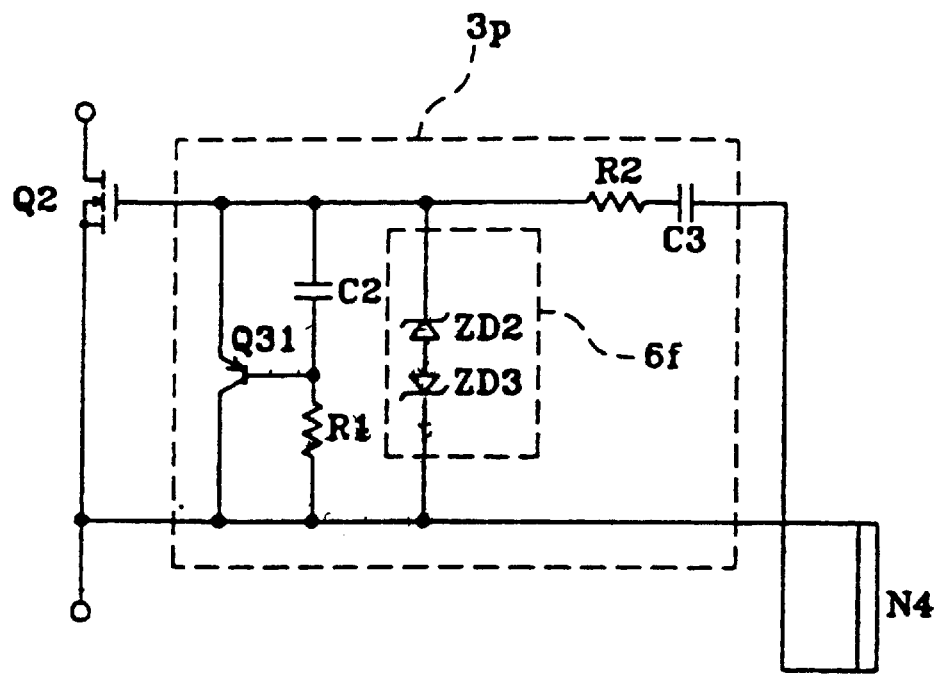
FIG. 21 is a circuit diagram of another modification of the switching power supply unit shown in FIG. 1.

A sub-control circuit 3p shown in FIG. 21 is formed in such a manner that in the sub-control circuit 3k shown in FIG. 17, a voltage-stabilizing circuit 6f comprising the Zener diode ZD3 connected in series to the Zener diode ZD2 in the opposite direction to the Zener diode ZD2 is disposed.

Figure 22:
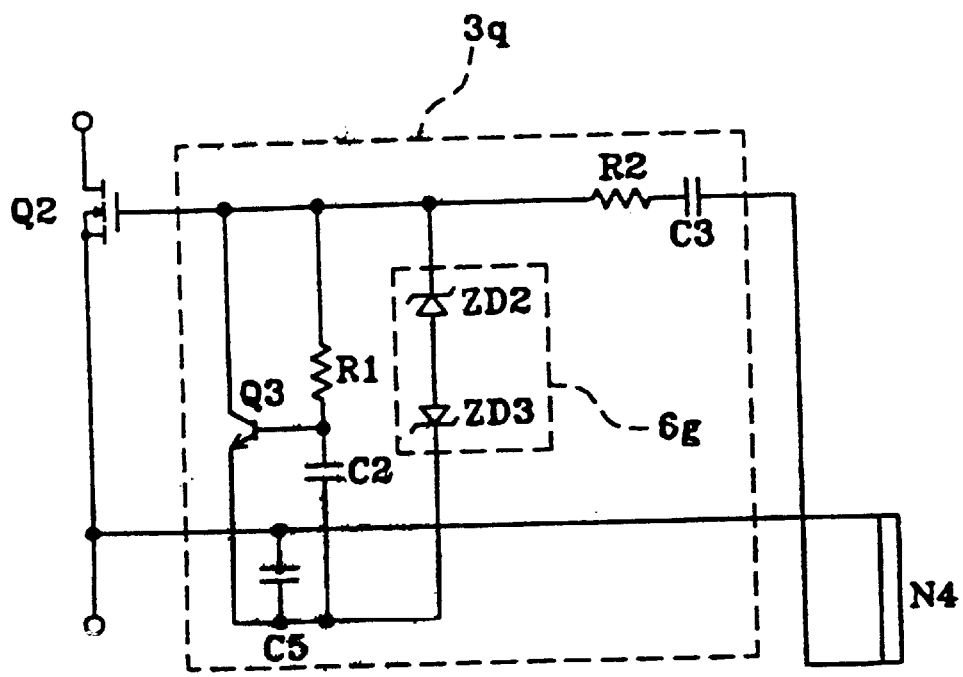
FIG. 22 is a circuit diagram of another modification of the switching power supply unit shown in FIG. 1.

A sub-control circuit 3q shown in FIG. 22 is formed in such a manner that in the sub-control circuit 3m shown in FIG. 18, a voltage-stabilizing circuit 6g comprising the Zener diode ZD3 connected in series to the Zener diode ZD2 in the opposite direction to the Zener diode ZD2 is disposed.

Figure 23:
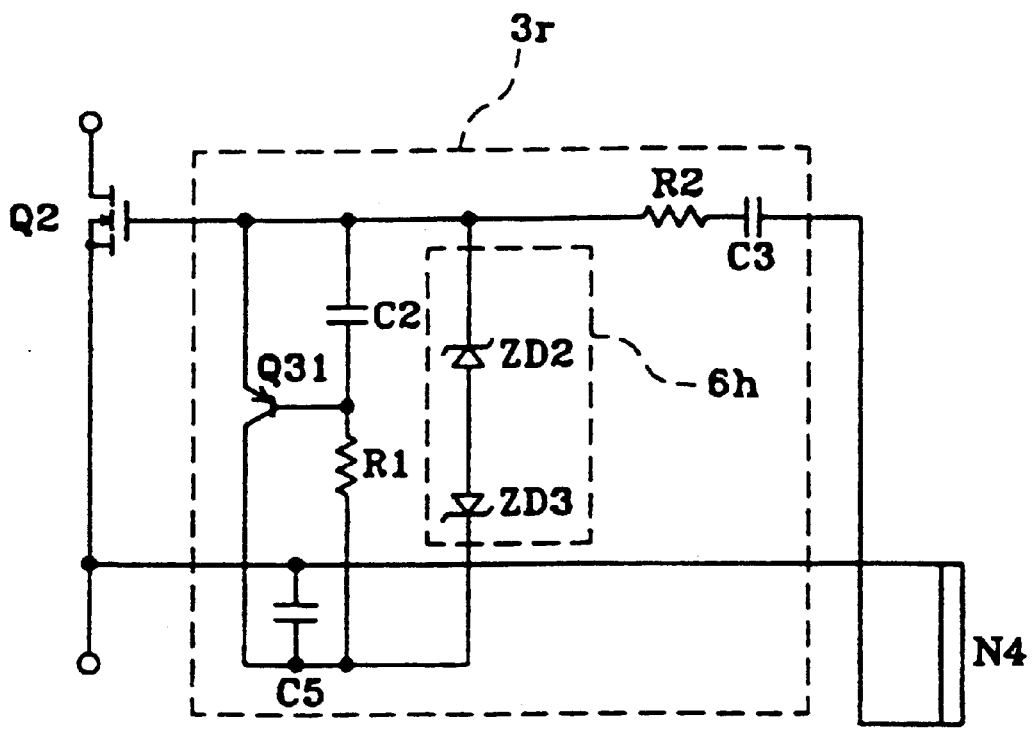
FIG. 23 is a circuit diagram of another modification of the switching power supply unit shown in FIG. 1.

A sub-control circuit 3r shown in FIG. 23 is formed in such a manner that in the sub-control circuit 3n shown in FIG. 19, a voltage-stabilizing circuit 6h comprising the Zener diode ZD3 connected in series to the Zener diode ZD2 in the opposite direction to the Zener diode ZD2 is disposed.

Figure 24:
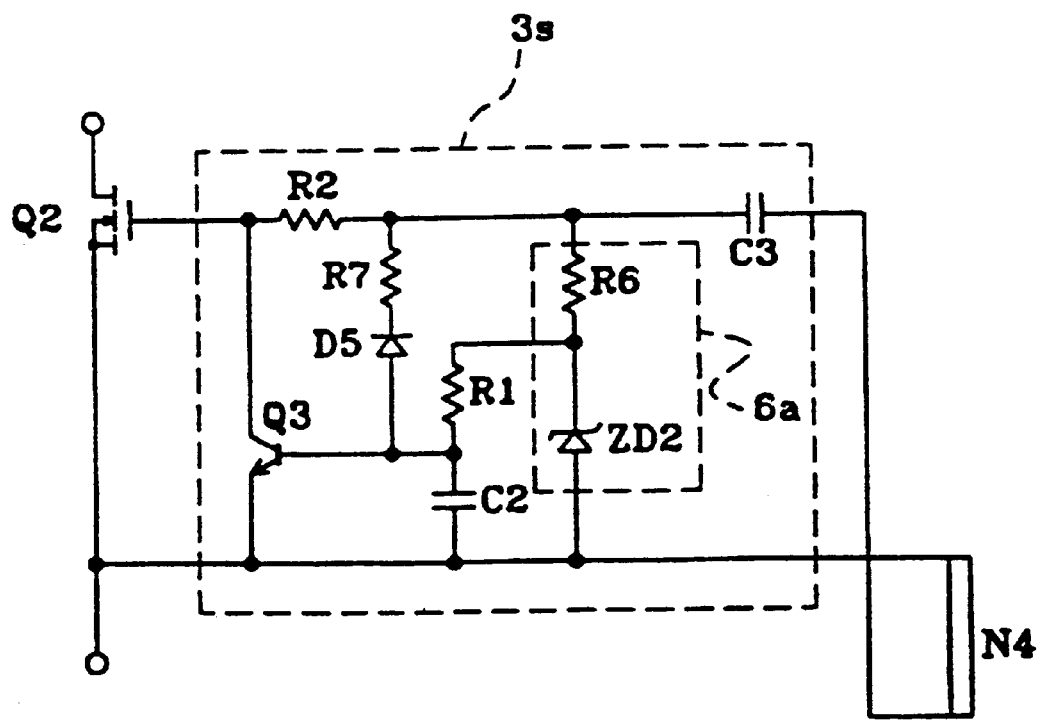
FIG. 24 is a circuit diagram of another modification of the switching power supply unit shown in FIG. 1.

A sub-control circuit 3s shown in FIG. 24 is formed in such a manner that in the sub-control circuit 3j shown in FIG. 16, the series circuit comprising the resistor R6 and the resistor R1 is disposed in parallel to the series circuit comprising the resistor R7 and the diode D5.

With such an arrangement, the electric charge accumulated in the capacitor C2 through the resistor R6 and the resistor R1 is removed through a different route comprising the diode D5 and a resistor R7. In this case, only when the capacitor C2 is discharged, a voltage proportional to the voltage generated in the second drive winding N4 is applied to the capacitor C2. As a result, the ON time of the FET Q2 can be changed to a degree with respect to the fluctuations of an input voltage so as not to perfectly maintain constant.

Additionally, the direction of the diode D5 may be reversed so as to apply a voltage proportional to the voltage generated in the second drive winding N4 to the capacitor C2 only when the capacitor C2 is charged.

As describe above, the seven embodiments have been given to illustrate the sub-control circuit having the voltage-stabilizing circuit. However, these are not the only applicable cases. For example, the same operational advantages can also be obtained by disposing a voltage-stabilizing circuit in each sub-control circuit shown in FIGS. 1, 4, 7, 8, 10 and 11.

Furthermore, although the voltage-stabilizing circuit comprising a Zener diode has been used in the above arrangement, other arrangements are also possible.

Figure 25:
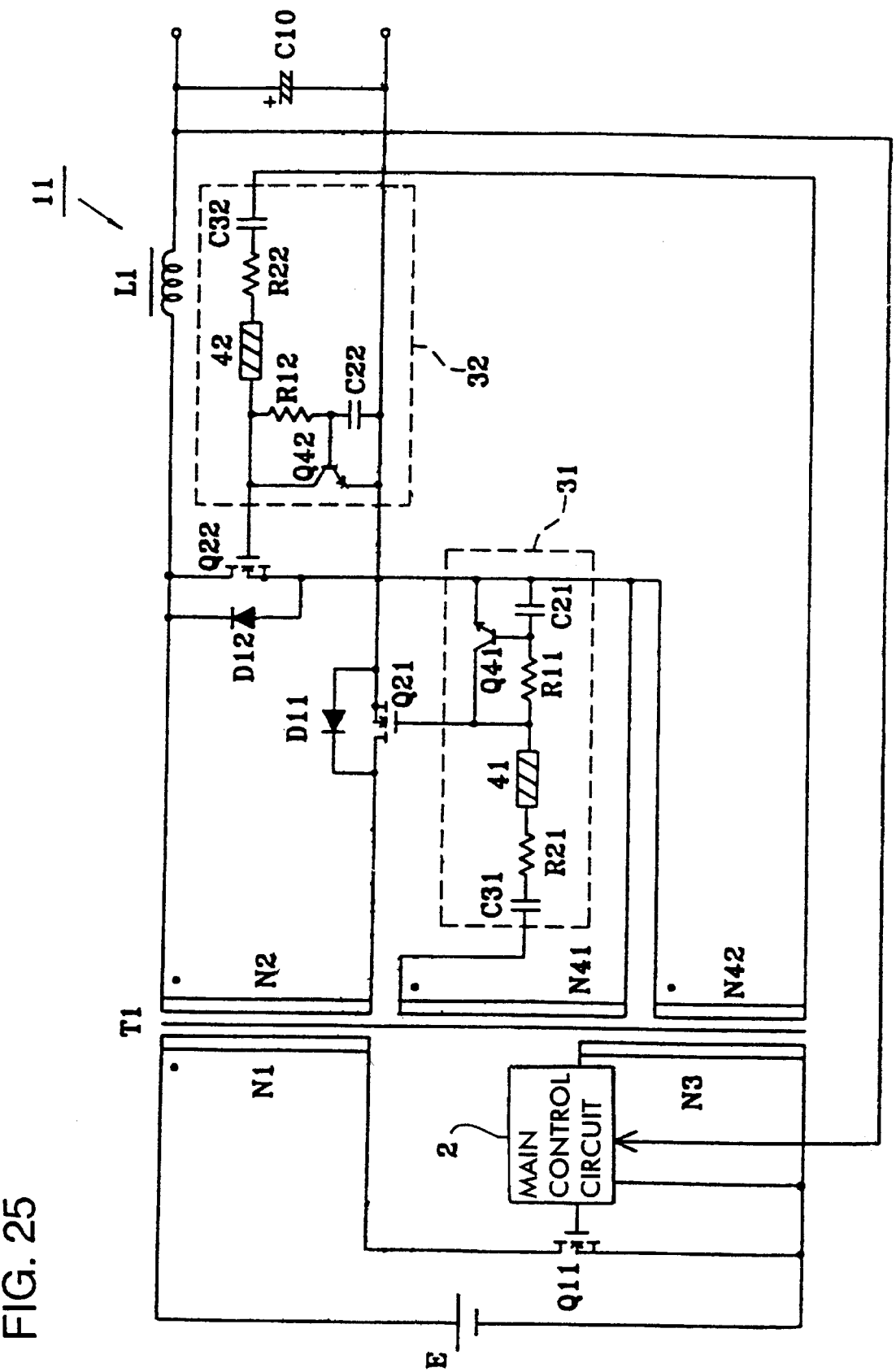
FIG. 25 is a circuit diagram of a switching power supply unit according to a second embodiment of the present invention.
Figure 26:
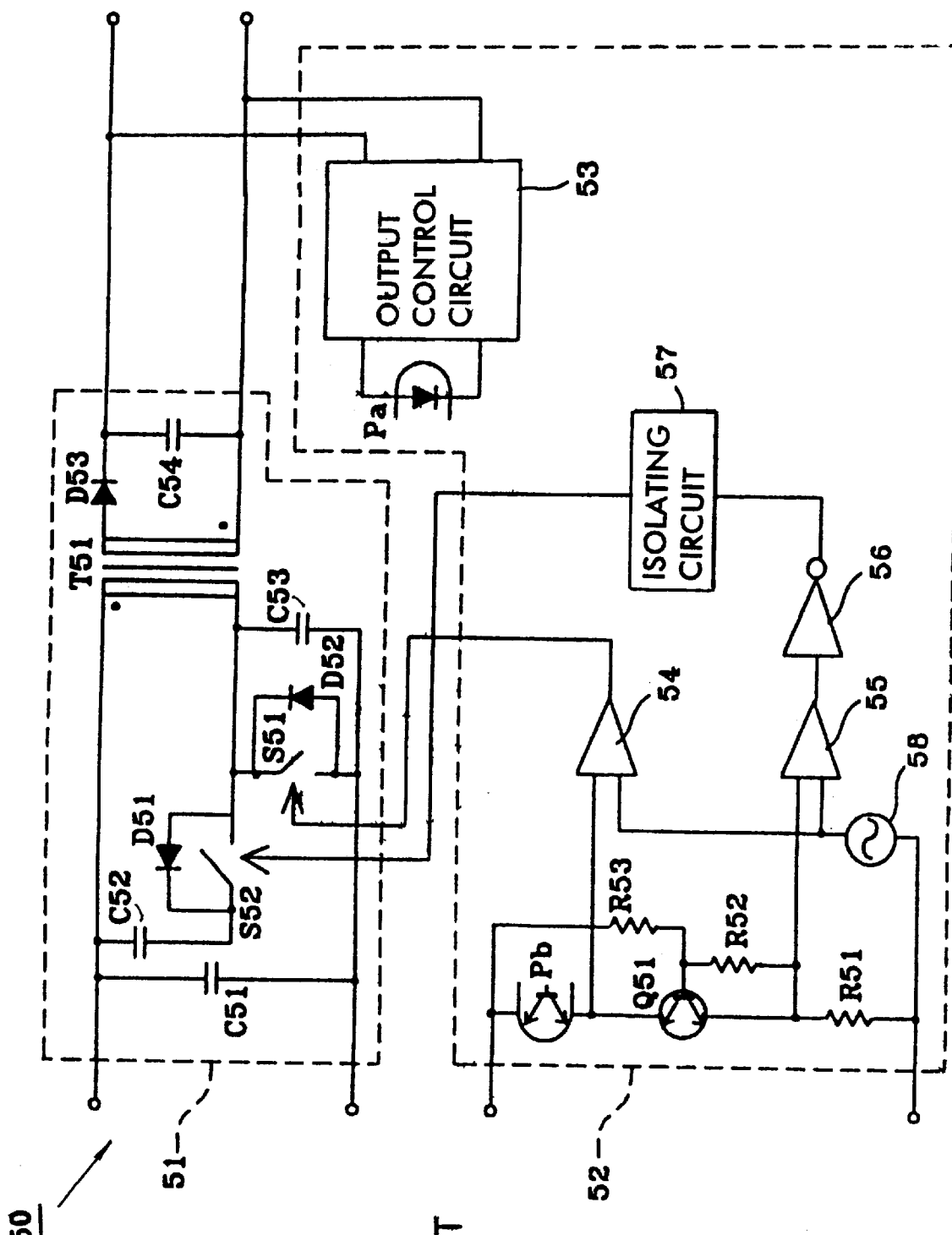
FIG. 26 is a circuit diagram of a conventional switching power supply unit.
Figure 27:
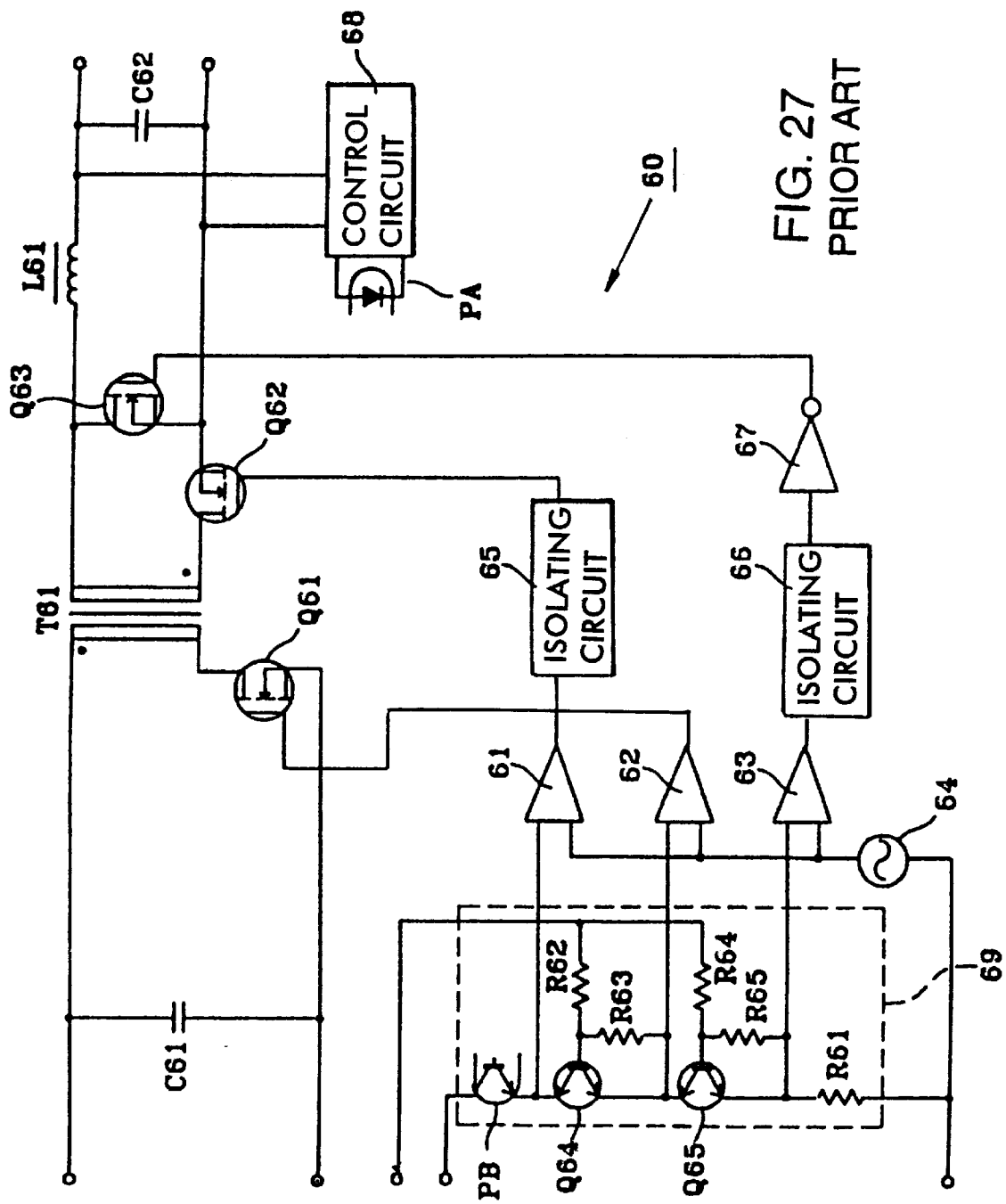
FIG. 27 is a circuit diagram of another conventional switching power supply unit.

Referring now to FIG. 25, a description will be given of the structure of a switching power supply unit according to a second embodiment of the present invention. In this figure, the same reference numerals are given to the same parts as those shown in FIG. 1 and the equivalent parts thereto, and the explanation thereof is omitted.

In FIG. 25, numeral 11 indicates a switching power supply unit, which is ordinarily referred to as a forward converter. Specifically, it uses the so-called synchronous rectification system, in which rectification is performed by two sub-switching elements disposed on the secondary side of the transformer. In the switching power supply unit 11, a main-switching element is alternately turned on/off to supply power to a load when it is turned on.

The switching power supply unit 11 comprises a transformer T1, an FET Q11 as a main-switching element, an FET Q21 and an FET Q22 as sub-switching elements, a main control circuit 2 for controlling the ON/OFF operations of the FET Q11, a diode D11 for connecting between the source and the drain of the FET Q21, a diode D12 for connecting between the source and the drain of the FET Q22, a first sub-control circuit 31 for controlling the ON/OFF operations of the FET Q21, and a second sub-control circuit 32 for controlling the ON/OFF operations of the FET Q22. Reference numeral L1 indicates an inductor as a smoothing circuit and reference numeral C10 indicates a capacitor, similarly, as a smoothing circuit.

The transformer T1 comprises a primary winding N1, a secondary winding N2, a main-switching-element drive winding (hereinafter referred to as a first drive winding) N3, a sub-switching-element drive winding (hereinafter referred to as a second drive winding) N41, and another sub-switching-element drive winding (hereinafter referred to as a third drive winding) N42. The FET Q11, the primary winding N1 of the transformer T1, and a DC power supply E are connected in series. The gate of the FET Q11 is connected to an end of the first drive winding N3 through the main control circuit 2. The DC power supply E may be made by rectifying and smoothing an AC input.

The gate of the FET Q21 is connected to an end of the second drive winding N41 through the first sub-control circuit 31, and the gate of the FET Q22 is connected to an end of the third drive winding N42 through the second sub-control circuit 32.

The first sub-control circuit 31 comprises a transistor Q41, a resistor R11 as a first impedance circuit, a capacitor C21 as a first capacitor, a resistor R21, a capacitor C31 as a second capacitor, and a bead 41. The capacitor C31, the resistor R21 and the bead 41 form a second impedance circuit.

The second sub-control circuit 32 comprises a transistor Q42, a resistor R12 as a first impedance circuit, a capacitor C22 as a first capacitor, a resistor R22, a capacitor C32 as a second capacitor, and a bead 42. The capacitor C32, the resistor R22 and the bead 42 form a second impedance circuit.

A description will be given of the operations of the switching power supply unit 11 having the above structure.

When the FET Q11 is turned on, voltage having the same polarity as that of the voltage generated in the secondary winding N2 is generated in the second drive winding N41 of the transformer T1. This voltage is applied to the gate of the FET Q21 through the capacitor C31, the resistor R21 and the bead 41 of the first sub-control circuit 31 so as to turn on the FET Q21.

The voltage generated in the second drive winding N41 of the transformer T1 allows the capacitor C21 to be charged through the resistor R11. When the charging voltage reaches the threshold voltage of the transistor Q41 to turn on the transistor Q41, the FET Q21 is turned off.

In this case, the time which it takes the voltage for charging the capacitor C21 to reach the threshold voltage of the transistor Q41 after the generation of voltage in the second drive winding N41, that is, an ON time of the FET Q21, is determined by a resistance value of the resistor R11 and the capacitance of the capacitor C21. Thus, the adjustment of a time constant to set the ON time of the FET Q21 depends on the selection of individual elements used as the resistor R11 and the capacitor C21.

When the FET Q11 is turned off after the FET Q21 is turned off, voltage having the reverse polarity with respect to that of the voltage generated when the FET Q11 is turned on is generated in the third drive winding N42. This voltage is applied to the gate of the FET Q22 through the capacitor C32, the resistor R22 and the bead 42 so as to turn on the FET Q22. The operations after this are the same as those in the case of the first sub-control circuit 31.

As the FET Q21, there is provided an element in which the voltage drop during an ON time is smaller than a forward voltage drop occurring when the diode D11 is in a continuity-state. In addition, the operations of the FET Q21 are performed substantially in synchronism with the rectifying diode D11. Consequently, almost no current flows through the diode D11 when the FET Q21 is turned on. In this case, the FET Q21 acts as a rectifying element. With this arrangement, conductive losses can be greatly reduced, heat-generation of the elements can be prevented, and power conversion factor can be improved.

In addition, similarly, as the FET Q22, there is provided an element in which the voltage drop during an ON time is smaller than a forward voltage drop occurring when the diode D12 is in a continuity-state. Additionally, the operations of the FET Q21 are performed substantially in synchronism with the rectifying diode D12. As a result, conductive losses can be greatly reduced, heat-generation of the elements can be prevented, and power conversion factor can be improved.

Adding to the above advantages, in the switching power supply unit according to the embodiment, the same advantages as those in the first embodiment can be obtained by using the two sub-switching-element control circuits, and the detailed explanation thereof is omitted.

The two sub-switching-element control circuits should not be limited to those shown in FIG. 25, and any of those shown in FIGS. 5 to 11 can be used.

Furthermore, the first and second impedance circuits disposed in the two sub-switching-element control circuits may be any of those shown in FIGS. 12 to 15, and FIGS. 16 to 24.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A switching power supply unit for providing a DC output comprising:
   a DC power supply;
   a transformer having a primary winding and a secondary winding;
   a main-switching element for connecting in series to the primary winding for performing ON/OFF operations;
   at least one sub-switching element for performing ON/OFF operations at least one of in synchronism with and in opposition to the ON/OFF operations of the main-switching element, the at least one sub-switching element having main switched terminals provided in a power line coupled to a load connected to the switching power supply unit, power to or from the load passing through the main switched terminals;
   the transformer having a sub-switching-element drive winding for generating a voltage turning the at least one sub-switching element on;
   a turn-off switching element turning the sub-switching element off; and
   a time-constant circuit for controlling the turn-off switching element.

2. The switching power supply unit of claim 1, wherein the turn-off switching element comprises a transistor having first and second main terminals and a control terminal, one of the main terminals being connected to a control terminal of the sub-switching element, the control terminal of the turn-off switching element being connected to the time-constant circuit.

3. The switching power supply unit of claim 2, wherein the sub-switching element has a control terminal connected to an end of the sub-switching-element drive winding through an impedance circuit.

4. The switching power supply unit of claim 3, wherein the impedance circuit has an inductor.

5. The switching power supply unit of claim 2, wherein the time-constant circuit comprises a first impedance circuit and a first capacitor charged and discharged by the voltage generated in the sub-switching-element drive winding.

6. The switching power supply unit of claim 5, wherein an impedance value of the first impedance circuit changes in accordance with the DC output or in response to a signal.

7. The switching power supply unit of claim 1, wherein the time-constant circuit comprises a first impedance circuit and a first capacitor charged and discharged by the voltage generated in the sub-switching-element drive winding.

8. The switching power supply unit of claim 7, wherein the impedance value of the first impedance circuit changes in accordance with a direction of current flowing through the first impedance circuit.

9. The switching power supply unit of claim 5, wherein an impedance value of the first impedance circuit changes in accordance with the DC output or in response to a signal.

10. The switching power supply unit of claim 9, wherein the sub-switching element has a control terminal connected to an end of the sub-switching-element drive winding through a second impedance circuit.

11. The switching power supply unit of claim 10, wherein the second impedance circuit has an inductor.

12. The switching power supply unit of claim 10, wherein the second impedance circuit has a second capacitor.

13. The switching power supply unit of claim 12, wherein the second impedance circuit has an inductor.

14. The switching power supply unit of claim 10, wherein the impedance circuit has a second capacitor.

15. The switching power supply unit of claim 14, wherein the second impedance circuit has an inductor.

16. The switching power supply unit of claim 7, wherein the sub-switching element has a control terminal connected to an end of the sub-switching-element drive winding through a second impedance circuit.

17. The switching power supply unit of claim 16, wherein the second impedance circuit has an inductor.

18. The switching power supply unit of claim 16, wherein the impedance value of the first impedance circuit changes in accordance with a direction of current flowing through the first impedance circuit.

19. The switching power supply unit of claim 16, wherein the second impedance circuit has a second capacitor.

20. The switching power supply unit of claim 19, wherein the impedance circuit has an inductor.

21. The switching power supply unit of claim 1, wherein the sub-switching element has a control terminal connected to an end of the sub-switching-element drive winding through an impedance circuit.

22. The switching power supply unit of claim 21, wherein the impedance circuit has an inductor.

23. The switching power supply unit of claim 21, wherein the impedance circuit has a capacitor.

24. The switching power supply unit of claim 23, wherein the impedance circuit has an inductor.

25. The switching power supply unit of claim 1, further comprising a voltage-stabilizing circuit for stabilizing voltage applied to the time-constant circuit.

26. The switching power supply unit of claim 25, wherein the voltage-stabilizing circuit includes a Zener diode.

27. The switching power supply unit of claim 1, wherein the at least one sub-switching element comprises two sub-switching elements, a first sub-switching element being turned on when the second sub-switching element is turned off and vice versa.

28. The switching power supply unit of claim 27, wherein the first and second sub-switching elements are connected to the secondary winding of the transformer.

29. The switching power supply unit of claim 1, wherein the at least one sub-switching element is connected to the secondary winding of the transformer.

30. The switching power supply unit of claim 1, wherein the at least one sub-switching element is connected to the primary winding of the transformer.

31. The switching power supply unit of claim 1, wherein the transformer has a main drive winding for driving the main-switching element.

* * * * *